US008434353B2

(12) United States Patent
Lachermeier

(10) Patent No.: US 8,434,353 B2
(45) Date of Patent: May 7, 2013

(54) DEVICE FOR BRAKE PAD WEAR MONITORING OF A BRAKE

(75) Inventor: Jakob Lachermeier, Freising (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 13/239,031

(22) Filed: Sep. 21, 2011

(65) Prior Publication Data
US 2012/0111101 A1    May 10, 2012

Related U.S. Application Data

(63) Continuation of application No. PCT/EP2010/001838, filed on Mar. 24, 2010.

(30) Foreign Application Priority Data

Mar. 25, 2009 (DE) .......................... 10 2009 014 799

(51) Int. Cl.
*G01L 5/28* (2006.01)
(52) U.S. Cl.
USPC .......................................................... 73/121
(58) Field of Classification Search .................... 73/121, 73/128
See application file for complete search history.

(56) References Cited

U.S. PATENT DOCUMENTS

| 4,204,190 A * | 5/1980 | Wiley et al. ................. 340/454 |
| 5,559,286 A * | 9/1996 | White et al. ..................... 73/129 |
| 5,608,376 A * | 3/1997 | Ito et al. ........................ 340/454 |
| 6,415,658 B1 * | 7/2002 | Takanashi et al. ............... 73/121 |
| 8,006,549 B2 * | 8/2011 | Hofler et al. ..................... 73/121 |
| 2006/0191789 A1 * | 8/2006 | Sydlowski et al. ........... 204/406 |

FOREIGN PATENT DOCUMENTS

| DE | 93 12 119.9 U1 | 1/1994 |
| DE | 42 43 875 A1 | 7/1994 |
| DE | 42 43 875 C2 | 4/1996 |
| DE | 4243875 C2 * | 4/1996 |
| DE | 43 29 994 C2 | 6/1999 |
| EP | 0 566 006 B1 | 2/1996 |

OTHER PUBLICATIONS

German Office Action dated Mar. 16, 2010 including English-language translation (Eight (8) pages).
International Search Report dated Jul. 20, 2010 including English-language translation (Four (4) pages).
International Preliminary Report on Patentability dated Oct. 6, 2011 including English-language translation (Fifteen (15) pages).

* cited by examiner

*Primary Examiner* — Freddie Kirkland, III
(74) *Attorney, Agent, or Firm* — Crowell & Moring LLP

(57) ABSTRACT

A system for monitoring brake pad wear of a brake, including an apparatus for monitoring brake pad wear of a first type (total wear monitoring) and an apparatus for monitoring brake pad wear of a second type (final-position wear monitoring). The apparatus of the first type and the apparatus of the second type are connected by way of a connection element. The connection element is created for expanding the functionality of a device for brake pad wear monitoring of a brake, and is designed to establish a connection expanding the functionality of the device between an apparatus extending the functionality and a device whose functionality is to be expanded.

17 Claims, 2 Drawing Sheets

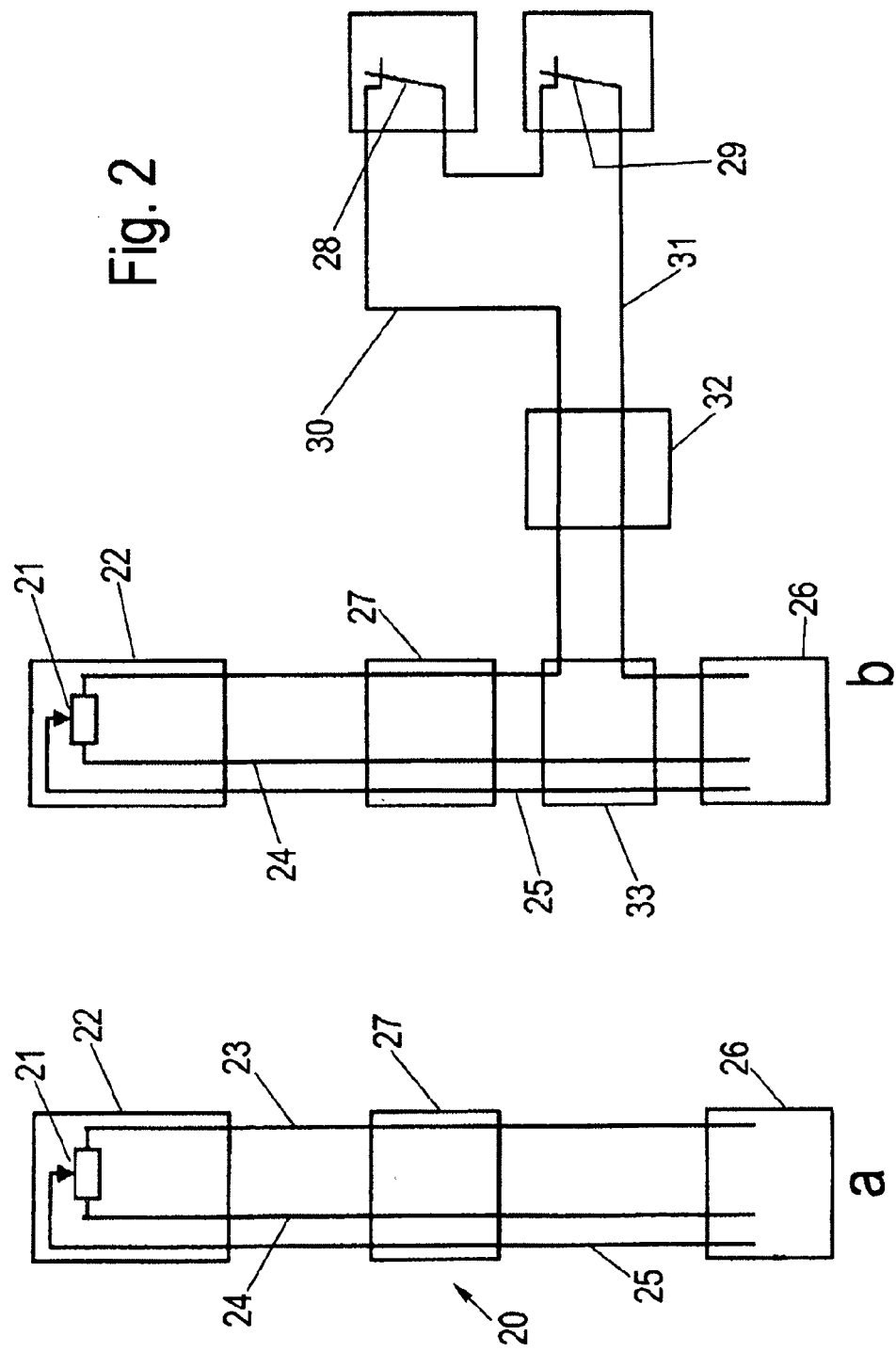

DEVICE FOR BRAKE PAD WEAR MONITORING OF A BRAKE

CROSS-REFERENCE TO RELATED APPLICATIONS

This application is a continuation of PCT International Application No. PCT/EP2010/001838, filed Mar. 24, 2010, which claims priority under 35 U.S.C. §119 from German Patent Application No. DE 10 2009 014 799.3, filed Mar. 25, 2009, the entire disclosures of which are herein expressly incorporated by reference.

BACKGROUND AND SUMMARY OF THE INVENTION

The invention relates to a device for brake pad wear monitoring of a brake.

Devices for brake pad wear monitoring are known to a person skilled in the art in various embodiments. For example, from DE 93 12 119 U1, a brake pad monitoring device is in a configuration as a rotary potentiometer. The rotary potentiometer is configured to sense rotations of an adjustment spindle of an adjustment element of a pneumatically activated disc brake, which rotations have been stepped down by means of a gear mechanism (total wear monitoring).

In addition, it is also known to provide brake pads with contacts. The contacts indicate when a maximum permissible wear travel has been reached (final-position wear monitoring).

The invention has the function of expanding the function of such devices or systems for brake pad wear monitoring which have proven themselves per se, and of therefore further improving such devices.

This goal is accomplished according to the present invention by providing a device or system for brake pad wear monitoring of a brake. The device or system includes an apparatus for monitoring brake pad wear of a first type (for example, total wear monitoring) and an apparatus for monitoring brake pad wear of a second type (for example, final-position wear monitoring). The apparatus for monitoring brake pad wear of the first type and the apparatus for brake pad wear monitoring of the second type are connected to one another by way of a connecting element.

In an embodiment of the invention, an apparatus for expanding the function of a device for brake pad wear monitoring of a brake is provided. The apparatus has a connecting element which is configured to produce a connection which expands the function of the device, between the function-expanding apparatus and the device which is to be expanded.

The present invention provides significant advantages over the prior art. By virtue of the possibility of linking or connecting devices for brake pad wear monitoring, which have two different apparatuses for pad wear monitoring, the reliability of these devices is increased.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2a shows part of a schematic electrical circuit diagram of a device for brake pad wear monitoring of a second type; and FIG. 2b shows the schematic electrical circuit diagram of FIG. 2a with a functional expansion.

DETAILED DESCRIPTION OF THE DRAWINGS

Figure 1:
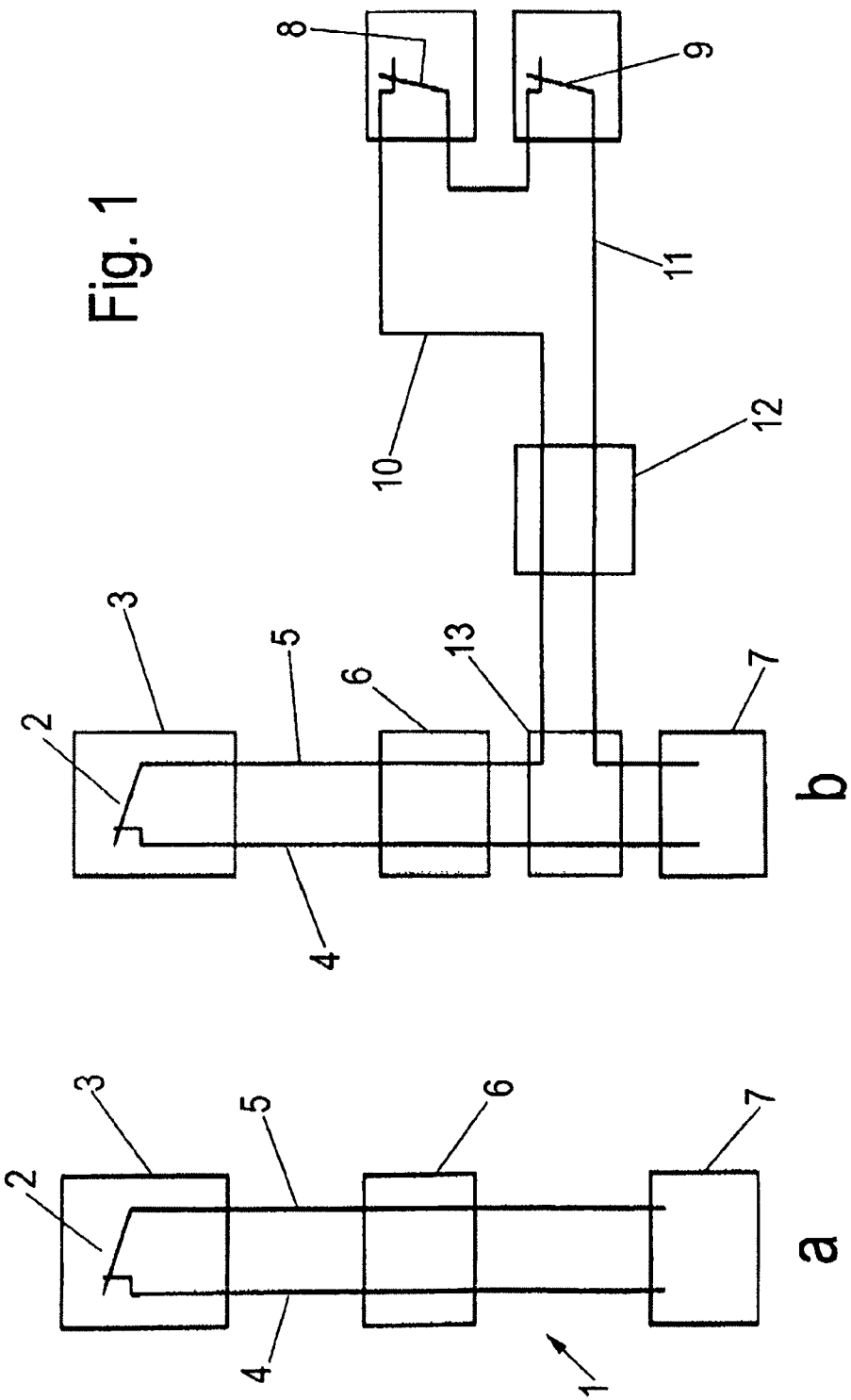
FIG. 1a shows part of a schematic electrical circuit diagram of a device for brake pad wear monitoring of a first type.
FIG. 1b shows the schematic electrical circuit diagram of FIG. 1a with a functional expansion.

FIG. 1a shows part of a schematic electrical circuit diagram of a device 1 for brake pad wear monitoring of a floating caliper type disc brake.

An electrical sensing element, for example a sensing element which is provided with a break contact 2 and which senses a movement of an adjustment element of a brake (not illustrated), is provided. The sensing element here is arranged on the brake which is to be monitored such that the sensing element generates an electrical signal; thus, for example, the break contact 2 opens, when the wear on the monitored brake pads exceeds a measure of here, for example, 37 mm. In effect, the wear requires an adjustment activity, which adjustment activity then triggers the sensing element. Such brake pad wear monitoring is referred to as total wear monitoring since in this way both pads and the brake disc of a brake are monitored. Unequal wear of the pads cannot be monitored. In this context, a brake pad may already be completely worn without the sensing element generating an electrical signal.

The break contact 2 is arranged in a housing 3 for providing protection against damaging effects. The signal generated by the break contact 2 in the case of triggering (opening of the break contact 2) passes via electrical lines 4 and 5 to a vehicle interface 7 via a housing interface 6. The signal is passed on to a display and/or evaluation device (not illustrated), for example to a signal light for the motor vehicle driver and/or to a control device (or an on-board computer), from the vehicle interface 7.

In a control device, the signal can be processed further and can be stored, together with an odometer reading, for example, for use in a visit to a service facility that occurs at a later time. Owing to the function of the sensing element 1a, the evaluation of the signal cannot provide complete reliability with respect to the residual pad thickness and the state of the disc. The evaluation of the residual pad thickness by way of the sensing element 1a therefore cannot be used, for example, in the case of a legally required brake pad inspection in Germany according to §29 (HU, SP).

FIG. 1b is the electrical circuit diagram of a device for monitoring brake pad wear according to FIG. 1a, provided with a function-expanded device.

The final-position wear contacts which are denoted by the reference signs 8 and 9 are, for example, electrical conductors which are embedded in a brake pad and which are destroyed by abrasion when a specific wear state (erosion) of the brake pad occurs. The electrical conductors are therefore equivalent in electrical behavior to a break contact which is opened.

The final-position wear contacts 8, 9 are connected as an apparatus for monitoring the brake pad wear to a connecting element 13 via electrical conductors 10, 11 and possibly via a housing interface 12.

An electrical connection is formed by way of the connecting element 13 such that the final-position wear contacts 8, 9 are connected in series with the break contact 2 (total wear monitoring). This ensures that as soon as one of the break contacts 2, 8, 9, which are connected in series, opens, an electrical signal is generated which can be displayed, evaluated and/or processed further in a way which has already been described above.

In an advantageous way, an existing device for monitoring brake pad wear of a brake, for example which has a first apparatus for pad wear monitoring (for example, total wear monitoring), can therefore be expanded with the function of a second pad wear apparatus (for example, final-position wear monitoring).

For example, vehicle brakes which are only equipped with total wear monitoring can be expanded by virtue of the invention with the functionality of final-position wear monitoring, and the residual pad thickness and a minimum disc measure can therefore be ensured. For this purpose, all that is necessary is to mount brake pads (not shown) having final-position wear contacts 8, 9 and to attach a connecting element 13 according to the invention. There is no need for any modifications to the vehicle interface 7 or the evaluation and display devices.

The connecting element 13 can be configured, for example, as an adapter which has means for producing an electrical and mechanical connection. The adapter can have latches, clamps and/or threaded connectors/fasteners for producing and securing a suitable mechanical connection between the adapter and the device which is to be expanded.

In order to produce a suitable electrical connection, the adapter can have plug-type connections, insulation-piercing clamping connections, screw-type connection or crimp connections, for example.

FIG. 2a shows part of a schematic electrical circuit diagram of a device 20 for brake pad wear monitoring. An electrical sensing element, for example a sensing element which is provided with a potentiometer 21 and which senses a movement of an adjustment element of a brake (not illustrated), is illustrated. In contrast to the devices illustrated in FIGS. 1a and 1b, the movement of the adjustment element is sensed continuously. That is to say an electrical signal, for example an electrical voltage is generated from which a conclusion can be drawn about a current position of the adjustment element. It is therefore possible, in contrast to the devices illustrated in FIGS. 1a and 1b, to monitor an adjustment range and not merely an adjustment point. Such monitoring is also referred to as constant or continuous monitoring. Unequal wear of the inner and outer pads cannot be monitored. In this context, a brake pad can already be completely worn even though the electrical signal does not allow conclusions to be drawn about the minimum pad thickness reached.

The potentiometer 21 is arranged in a housing 22 in order to protect it, for example, against damaging influences. The potentiometer 21 is supplied with an electrical voltage, for example with a direct voltage of 5V, by way of electrical lines 23, 24. The voltage which is proportional to an adjustment point is conducted to a vehicle interface 26 via an electrical line 25. The supply voltage is made available at the vehicle interface 26, and the voltage which is proportional to an adjustment point is passed on to a display and/or further processing device (both not illustrated) for the purpose of displaying and/or further processing. The lines 23, 24, 25 are passed on via a housing interface 27.

FIG. 2b is the electrical circuit diagram of a device according to FIG. 2a which is functionally expanded with an apparatus according to the invention.

The final-position wear contacts which are denoted by the reference signs 28 and 29 are, for example, electrical conductors which are embedded in a brake pad and which are destroyed by abrasion in a certain wear state (erosion) of the brake pad, and therefore are similar in electrical behavior to a break contact which is opened.

The final-position wear contacts 28, 29 are connected via electrical conductors 30, 31, and possibly via a housing interface 32, to a connecting element 33.

By way of the connecting element 33, the final-position wear contacts 28, 29 are electrically connected to the potentiometer 21 (total wear monitoring) in such a way that opening of at least one of the final-position wear contacts 28, 29 can be evaluated electronically. This connection and evaluation can be carried out in various ways with which a person skilled in the art is familiar. For example, provided that the sensing of the voltage which can be tapped at the line 25 occurs with sufficiently high impedance it is possible to assume that there is a constant flow of current through the lines 23 and 24 and therefore also through the final-position wear contacts 28, 29. If at least one final-position wear contact 28, 29 opens, this flow of current changes suddenly. Such a change can be detected by an evaluation device, displayed and/or further processed.

An existing device for constant brake pad wear monitoring, for example total wear monitoring, can therefore be advantageously expanded with the function of final-position wear monitoring. For example, vehicle brakes which are only equipped with total wear monitoring can be expanded using the invention with the functionality of final-position wear monitoring.

For this purpose, all that is necessary is to mount brake pads (not shown) having final-position wear contacts 28, 29 and to attach a connecting element 33. No modifications are necessary to the vehicle interface 26 or the evaluation and display devices.

The statements which have already been made with respect to the connecting element 13 apply equally to the configuration of the connecting element 33.

The invention provides the possibility of expanding existing devices for brake pad wear monitoring 1, 20 with additional functions without changes to the vehicle interface 7, 26. As a result, inter alia, monitoring redundancy is achieved since additional brake pad states can be evaluated. This leads to an increase in the reliability of the expanded wear monitoring systems and can be used, for example, in the case of a legally required inspection for the purpose of evaluating the residual pad thickness. The existing devices for brake pad wear monitoring 1, 20 cannot sense unequal wear states of the pads. In this context, a brake pad may already be completely worn even though the electrical signal does not make it possible to draw any conclusions about the minimum pad thickness reached.

Additionally, it is contemplated to equip a connecting element 13, 33 with electrical and/or mechanical coding mechanisms. In this way, it is possible to reliably prevent the connection of an inadmissible or improper combination of devices.

If the connecting element 13, 33 is equipped with an identification device, it is possible, for example, for an evaluation device to detect an activated function-expanding apparatus and react, for example, with possibly automatic software adaptation.

Instead of the final-position wear contacts it would also be possible to use wear resistance contacts as one of the apparatuses for brake pad wear monitoring.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake pad wear monitoring system for a brake, the system comprising:
a first apparatus for monitoring brake pad wear of a first type;
a second apparatus for monitoring brake pad wear of a second type; and
a connecting element operatively configured to connect the first apparatus for monitoring brake pad wear of the first type to the second apparatus for monitoring brake pad wear of the second type;
wherein the connecting element is arranged between housing interfaces for at least two housings and a vehicle interface.

2. The system according to claim 1, wherein the first apparatus of the first type is a total wear monitoring apparatus operatively configured to utilize functionality of the second apparatus of the second type which performs final-position wear monitoring.

3. The system according to claim 1, wherein the connecting element comprises at least one of an electrical connection or a mechanical connection.

4. The system according to claim 3, wherein the electrical connection is a plug-type connection.

5. The system according to claim 4, wherein the mechanical connection comprises at least one of a latch, a clamp, or a threaded connector.

6. The system according to claim 5, wherein the connecting element further comprises at least one of an electrical coding mechanism or a mechanical coding mechanism.

7. The system according to claim 6, wherein the connecting element further comprises an identification device.

8. The system according to claim 3, wherein the electrical connection comprises an insulation-piercing clamping connector or a threaded connector.

9. The system according to claim 8, wherein the mechanical connection comprises at least one of a latch, a clamp, or a threaded connector.

10. The system according to claim 3, wherein the electrical connection is a crimp connection.

11. The system according to claim 3, wherein the mechanical connection comprises at least one of a latch, a clamp, or a threaded connector.

12. The system according to claim 3, wherein the connecting element further comprises at least one of an electrical coding mechanism or a mechanical coding mechanism.

13. The system according to claim 12, wherein the connecting element further comprises an identification device.

14. The system according to claim 3, wherein the connecting element further comprises an identification device.

15. The system according to claim 1, wherein the connecting element is configured to cause an evaluation device to detect the first apparatus of the first type.

16. The system according to claim 15, wherein the connecting element is configured to cause the evaluation device to perform automatic software adaptation.

17. An apparatus for expanding functionality of a brake pad wear monitoring device of a brake, the apparatus comprising:
a connecting element operatively configured to provide a connection for expanding the functionality of the brake pad wear monitoring device, said connection being between a function-expanding apparatus and a device whose function is to be expanded;
wherein the connecting element is configured to be arranged between housing interfaces for at least two housings and a vehicle interface.

* * * * *